US007165818B2

(12) United States Patent
Iwasaki et al.

(10) Patent No.: US 7,165,818 B2
(45) Date of Patent: Jan. 23, 2007

(54) VEHICLE ATTITUDE CONTROL SYSTEM

(75) Inventors: Katsuya Iwasaki, Kanagawa (JP);
Kotaro Koyama, Kanagawa (JP); Jun Kubo, Tokyo (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/920,379

(22) Filed: Aug. 18, 2004

(65) Prior Publication Data
US 2005/0040704 A1 Feb. 24, 2005

(30) Foreign Application Priority Data
Aug. 18, 2003 (JP) ............................. 2003-207685

(51) Int. Cl.
B60T 8/42 (2006.01)
(52) U.S. Cl. .................. 303/115.5; 303/142; 303/146; 303/162
(58) Field of Classification Search .................. 303/11, 303/142, 161 X, 162, 116.1, 116.3, 116.4, 303/115.4, 115.5, 146 X
See application file for complete search history.

(56) References Cited

U.S. PATENT DOCUMENTS

| 5,454,632 | A | * | 10/1995 | Burgdorf et al. | ......... 303/115.4 |
| 6,095,620 | A | * | 8/2000 | Dillard et al. | ................. 303/11 |
| 6,158,825 | A | * | 12/2000 | Schunck et al. | ......... 303/115.4 |
| 6,286,914 | B1 | * | 9/2001 | Sawada et al. | ........... 303/113.2 |
| 6,315,369 | B1 | * | 11/2001 | Hirose | .......................... 303/10 |
| 6,402,260 | B1 | * | 6/2002 | Kobayashi et al. | ........... 303/20 |
| 6,582,034 | B2 | | 6/2003 | Hara et al. | |
| 2002/0021044 | A1 | * | 2/2002 | Hara et al. | ..................... 303/16 |

FOREIGN PATENT DOCUMENTS

JP 2002-046588 A 2/2002

* cited by examiner

Primary Examiner—Xuan Lan Nguyen
(74) Attorney, Agent, or Firm—Foley & Lardner LLP

(57) ABSTRACT

In a vehicle attitude control system of an automotive vehicle employing a pump-and-motor assembly, and a hydraulic actuator that regulates fluid pressures in wheel-brake cylinders of road wheels of the vehicle, independently of each other, a control unit is electronically connected to at least a motor of the pump-and-motor assembly and the hydraulic actuator, for executing vehicle attitude control by controlling a discharge pressure of the motor-driven pump and by controlling the fluid pressures in the wheel-brake cylinders to respective desired fluid pressures independently of each other. A processing unit of the control unit is programmed to determine a duty ratio of a drive signal of the motor, based on the desired fluid pressure of at least one of the wheel-brake cylinders.

13 Claims, 5 Drawing Sheets

VEHICLE ATTITUDE CONTROL SYSTEM

TECHNICAL FIELD

The present invention relates to an automotive vehicle attitude control system containing a traction control function and a vehicle dynamics control (VDC) function or a vehicle stability control (VSC) function, and specifically to the improvement of an automatic vehicle-attitude-control technology containing a motor drive control function for a hydraulic pump and motor assembly incorporated in a vehicle attitude control system with braking system interaction.

BACKGROUND ART

In recent years, there have been proposed and developed various vehicle attitude control systems interacting with vehicle brake control systems to execute vehicle attitude control by controlling four wheel-brake cylinder pressures independently of each other. Generally, the vehicle brake control system often interacts with the other vehicle systems, such as a vehicle-to-vehicle distance control system, a lane-deviation prevention (LDP) system, a traction (acceleration-slip) control system (TCS), an anti-skid braking system (ABS), a brake assist (BA) control system, a collision avoidance system, a vehicle dynamics control (VDC) system and the like. One such vehicle brake control system capable of interacting with the other vehicle systems, for example, a vehicle-to-vehicle distance control system, a traction control system, an anti-skid braking system, and a brake assist control system, has been disclosed in Japanese Patent Provisional Publication No. 2002-46588 (hereinafter is referred to as "JP2002-46588"), corresponding to U.S. Pat. No. 6,582,034 whose date of patent is Jun. 24, 2003. In the vehicular brake control system disclosed in JP2002-46588, during one cycle of the brake pressure-increasing mode (the brake pressure build-up operating mode) for vehicle-to-vehicle distance control, the distance of a host vehicle relative to the preceding vehicle is properly adjusted to a predetermined relative distance by way of the automatically controlled braking force. A basic method to automatically adjust the vehicle-to-vehicle distance is to apply almost the same magnitude of braking force to each individual road wheel, while keeping the straight-line vehicle stability. When the vehicle-to-vehicle distance control system of JP2002-46588 is in operation, motor drive control (motor rotational-speed control) is simultaneously executed in such a manner that an electric motor of a pump-and-motor assembly is driven quietly to such an extent that the driver does not take notice of automatic braking action during vehicle-to-vehicle distance adjustment. Concretely, the motor speed is properly suppressed to a low level by way of pulse-width modulated (PWM) control, thus avoiding an excessive brake pressure rise occurring owing to a system failure. More concretely, immediately after switching to the pressure build-up operating mode, an initial duty ratio of the pulse-width modulated signal is set to "100%", and held at "100%" for a brief moment. Thereafter, the duty ratio is changed from "100%" to "20%", and held at "20%" for a predetermined period of time. After this, as soon as the host vehicle's acceleration reaches a desired acceleration value during the pressure build-up operating mode, the duty ratio of the PWM signal is switched to "0%". As discussed above, regarding the motor drive control (motor speed control) simultaneously executed during the pressure build-up operating mode for vehicle-to-vehicle distance control, JP2002-46588 teaches the specified PWM signal duty-ratio pattern or the predetermined combined duty-ratio pattern of a 100% duty ratio, a 20% duty ratio, and a 0% duty ratio.

On the other hand, vehicle attitude control systems must serve to positively apply a properly controlled braking force to each road wheel during cornering, so as to ensure stable cornering behavior of the vehicle by producing a controlled yawing moment. During vehicle attitude control, such as understeer or oversteer suppression control, braking forces required for respective road wheels differ from each other. Therefore, the motor of the pump-and-motor assembly of the brake control system tends to be fully rotated to supply brake fluid pressures, corresponding to the required braking forces and produced by means of a hydraulic modulator (or a hydraulic actuator), to the respective road wheels. Full rotation of the motor, activated during operation of the vehicle attitude control system, leads to a problem of increased noise. Thus, it would be desirable to optimize motor drive control, in other words, noise control for noise created by the pump-and-motor assembly during the vehicle attitude control.

SUMMARY OF THE INVENTION

Accordingly, it is an object of the invention to provide a vehicle attitude control system, capable of realizing optimum noise control containing reasonably silent motor drive and effective reduction in undesired noise created by a hydraulic pump and motor assembly (a noise source) activated to produce brake fluid pressures corresponding to required braking forces for respective road wheels during vehicle attitude control, thus ensuring an acceptable noise environment for vehicle occupants.

In order to accomplish the aforementioned and other objects of the present invention, a vehicle attitude control system of an automotive vehicle comprises a hydraulic pump and motor assembly comprising at least one hydraulic pump and a motor driving the pump, a hydraulic actuator that regulates fluid pressures in wheel-brake cylinders of road wheels of the vehicle, independently of each other, and a control unit being configured to be electronically connected to at least the motor and the hydraulic actuator, for executing vehicle attitude control by controlling a discharge pressure of the motor-driven pump and by controlling the fluid pressures in the wheel-brake cylinders to respective desired fluid pressures independently of each other, the control unit comprising a processor programmed to perform the following, determining a duty ratio of a drive signal of the motor, based on the desired fluid pressure of at least one of the wheel-brake cylinders.

According to another aspect of the invention, a vehicle attitude control system of an automotive vehicle comprises a hydraulic pump and motor assembly comprising at least one hydraulic pump and a motor driving the pump, a hydraulic actuator that regulates fluid pressures in wheel-brake cylinders of road wheels of the vehicle, independently of each other, and control means being configured to be electronically connected to at least the motor and the hydraulic actuator, for executing vehicle attitude control by controlling a discharge pressure of the motor-driven pump and by controlling the fluid pressures in the wheel-brake cylinders to respective desired fluid pressures independently of each other, the control means comprising motor duty ratio determination means for determining a duty ratio of a drive signal of the motor, based on the desired fluid pressure of at least one of the wheel-brake cylinders.

According to a further aspect of the invention, a vehicle attitude control method of simultaneously executing motor noise control and vehicle attitude control by controlling a discharge pressure of a pump driven by a motor and by controlling fluid pressures in wheel-brake cylinders of road wheels to respective desired fluid pressures independently of each other, the method comprises determining a duty ratio of a drive signal of the motor, based on the desired fluid pressure of at least one of the wheel-brake cylinders. Preferably, the method may comprise calculating duty ratios, needed for motor drive control, based on the respective desired fluid pressures of the wheel-brake cylinders of the road wheels, selecting a highest duty ratio of the duty ratios, calculating a road-surface friction factor dependent duty-ratio maximum value based on a road-surface friction factor ($\mu$), executing a road-surface $\mu$ dependent duty-ratio limiter processing for limiting an upper limit value of the duty ratio of the drive signal of the motor to the road-surface $\mu$ dependent duty-ratio maximum value by selecting a lower duty ratio of the selected highest duty ratio and the road-surface $\mu$ dependent duty-ratio maximum value, executing a traction-control period duty-ratio upper limiter processing for limiting the upper limit value of the duty ratio to a predetermined traction-control period duty-ratio maximum value by selecting a lower duty ratio of the predetermined traction-control period duty-ratio maximum value and the lower duty ratio of the selected highest duty ratio and the road-surface $\mu$ dependent duty-ratio maximum value, and executing a vehicle-dynamics-control period duty-ratio upper limiter processing for limiting the upper limit value of the duty ratio to a predetermined vehicle-dynamics-control period duty-ratio maximum value by selecting a lower duty ratio of the predetermined vehicle-dynamics-control period duty-ratio maximum value and the lower duty ratio of the selected highest duty ratio and the road-surface $\mu$ dependent duty-ratio maximum value.

The other objects and features of this invention will become understood from the following description with reference to the accompanying drawings.

DESCRIPTION OF THE PREFERRED EMBODIMENTS

Figure 1:
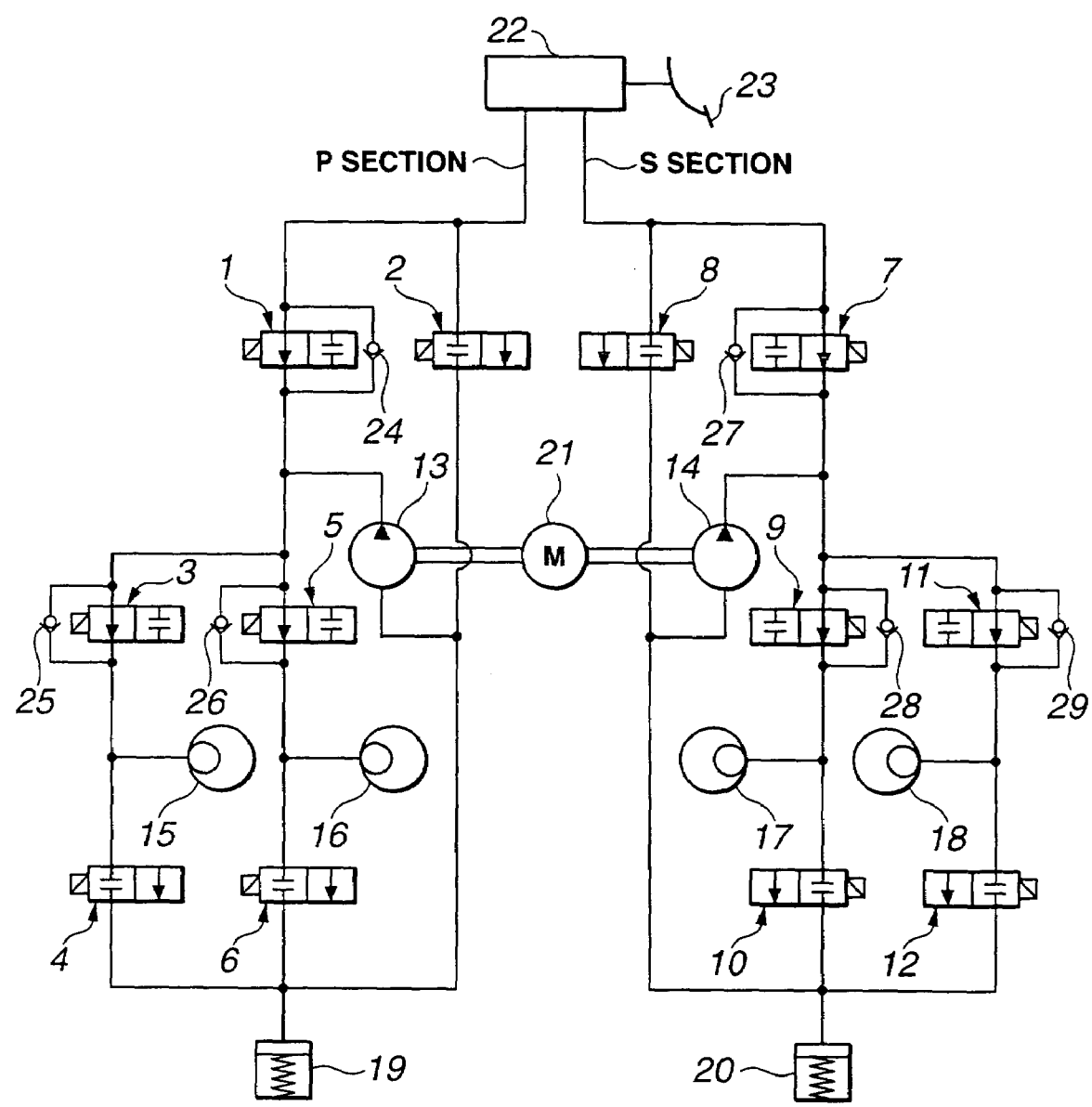
FIG. 1 is a hydraulic circuit diagram showing hydraulic system components constructing a hydraulic brake control system interacting with a vehicle attitude control system of an embodiment.
Figure 2:
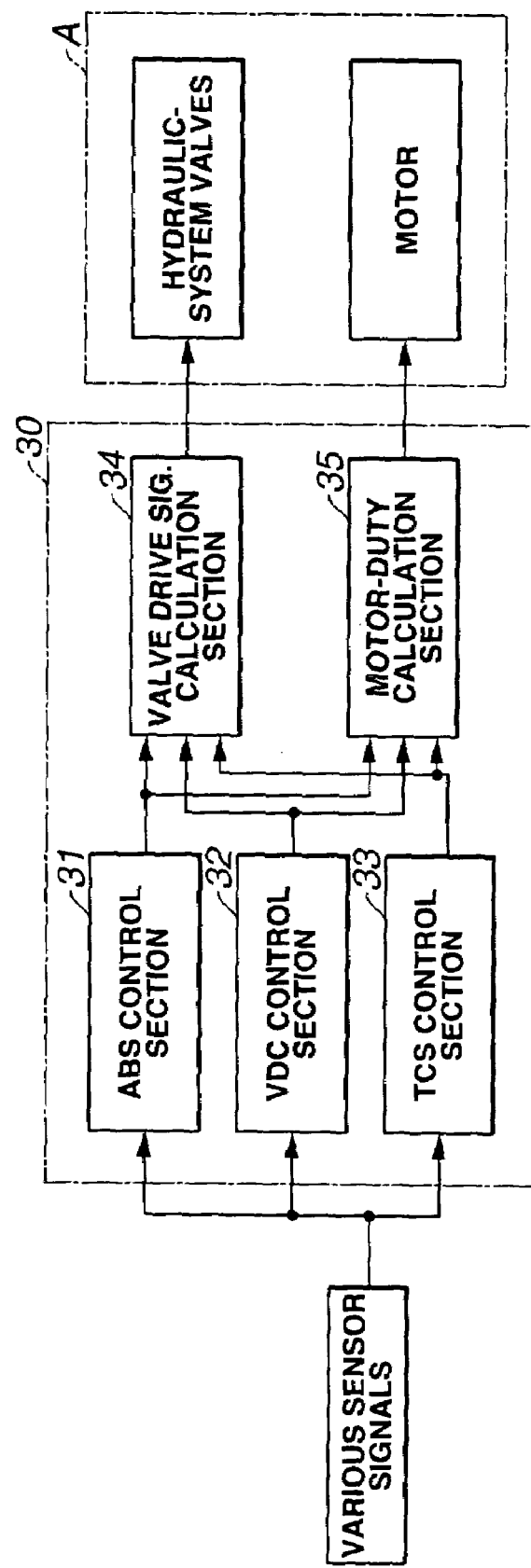
FIG. 2 is a block diagram of an electronic control unit applicable to the vehicle attitude control system of the embodiment.

Referring now to the drawings, particularly to FIG. 1, there is shown the circuit diagram of the hydraulic brake control system capable of interacting with the vehicle attitude control system of the embodiment. As clearly shown in FIG. 1, the braking system is comprised of a dual circuit hydraulic brake system. Four wheel-brake cylinders 15, 16, 17, and 18 are provided to produce braking forces required for four road wheels independently of each other. Wheel-brake cylinders 15, 16, 17, and 18 are connected to a tandem master cylinder 22, used for a dual circuit brake system split into two separate sections, namely a primary brake section (P section) and a secondary brake section (S section), through the P and S sections. Hydraulic pressures in wheel-brake cylinders 15 and 16, associated with the P section, and hydraulic pressures in wheel-brake cylinders 17 and 18, associated with the S section are independently controlled by means of a hydraulic modulator or a hydraulic actuator A, which is shown in FIG. 2. Hydraulic actuator A is comprised of fluid-pressure control valves (inflow valves 3, 5, 9, 11 and outflow valves 4, 6, 10, 12), and hydraulic pressure source switching valves (a P-section cutoff valve 1, a P-section inlet valve 2, an S-section cutoff valve 7, and an S-section inlet valve 8), and pressure reservoirs 19 and 20. In FIG. 1, hydraulic system components denoted by reference signs 24, 25, and 26 are P-section check valves, whereas hydraulic system components denoted by reference signs 27, 28, and 29 are S-section check valves. Fluid pressure control valves, constructed by inflow valves 3, 5, 9, 11, and outflow valves 4, 6, 10, 12, are provided to build up, reduce, or hold the fluid pressures in wheel-brake cylinders 15–18 independently of each other. In the shown embodiment, each of inflow valves 3, 5, 9, and 11, and P-section cutoff valve 1 and S-section cutoff valve 7 is comprised of a normally-open electromagnetic solenoid-actuated two-position valve. On the other hand, each of outflow valves 4, 6, 10, and 12, and P-section inlet valve 2 and S-section inlet valve 8 is comprised of a normally-closed electromagnetic solenoid-actuated two-position valve. As can be seen from the hydraulic circuit diagram of FIG. 1, in addition to a standard hydraulic pressure source (a first pressure source), that is, master cylinder 22, used to produce a braking force responsively to the brake-pedal depression by the driver, a P-section hydraulic pump 13 and an S-section hydraulic pump 14 are further provided for various automatic vehicle controls, namely ABS control, TCS control, and VDC control. Pumps 13 and 14 are driven by means of a common motor 21. P-section pump 13, S-section pump 14, and common motor 21 construct a pump-and-motor assembly, and serves as a second hydraulic pressure source. Switching between fluid-pressure supply from master cylinder 22 and fluid-pressure supply from each of pumps 13 and 14 is achieved by means of the pressure source switching valves (P-section cutoff valve 1, P-section inlet valve 2, S-section cutoff valve 7, and S-section inlet valve 8).

The operation of motor 21 and opening and closing operations of inflow valves 3, 5, 9, and 11, outflow valves 4, 6, 10, and 12, and pressure source switching valves 1, 2, 7, and 8 are respectively controlled by means of an electronic control unit 30 (described later in reference to the block diagram shown in FIG. 2). Thus, the brake control system of FIG. 1 can be operated in either a normal braking state (a normal braking mode) or an automatically controlled braking state (a controlled braking mode). When the brake control system is in the normal braking mode, a master-cylinder pressure created by depression of a brake pedal 23 by the driver is supplied to each of wheel-brake cylinders 15–18. On the contrary, when the brake control system is in the controlled braking mode, the fluid pressures produced by P-section pump 13 and S-section pump 14 are properly regulated by means of the fluid-pressure control valves, and the properly regulated fluid pressure are supplied to the respective wheel-brake cylinders 15–18. Actually, the wheel-brake cylinder pressure of each individual wheel-brake cylinder can be properly regulated according to a selected one of a pressure build-up operating mode, a pressure hold operating mode, and a pressure reduction operating mode, determined by controlling opening and closing conditions (activation/deactivation conditions) of each of the hydraulic system valves.

The pressure control action of each of individual wheel-brake cylinders 15–16 included in the P section is similar to that of each of individual wheel-brake cylinders 17–18 included in the S section. For the sake of simplicity, a single wheel-brake cylinder, such as wheel-brake cylinder 15, will be assumed in the following description of the fundamental operational principles of the brake pressure control system.

When the fluid pressure in wheel-brake cylinder 15 of the P section has to be controlled or regulated, during a pump-based pressure build-up operating mode with P-section pump 13 driven, P-section inlet valve 2 is fully opened and thus brake fluid is supplied from the master-cylinder side through P-section inlet valve 2 into the inlet port of pump 13. At this time, P-section cutoff valve 1 is fully closed and simultaneously inflow valve 5 associated with the other P-section wheel-brake cylinder 16 is fully closed, thereby preventing brake-fluid flow to the other wheel-brake cylinder 16 in the P-section. Inflow valve 3 (normally-open electromagnetic solenoid-actuated two-position valve) associated with P-section wheel-brake cylinder 15, which is subjected to fluid-pressure control, is conditioned in a valve-open state (a de-activated state). On the other hand, outflow valves 4 and 6 (normally-closed electromagnetic solenoid-actuated two-position valves) associated with respective P-section wheel-brake cylinders 15 and 16, are conditioned in their valve-closed states (de-activated states). Pressurized brake fluid discharged from pump 13 can be fed through inflow valve 3 into wheel-brake cylinder 15. In this manner, the pump-based pressure build-up operating mode for wheel-brake cylinder 15 is achieved. Under these conditions, when switching from the pump-based pressure build-up operating mode to the pressure reduction operating mode, P-section inlet valve 2 is switched from the valve-open state to the valve-closed state, whereas P-section cutoff valve 1 is switched from the valve-closed state to the valve-open state. As a result of this, the brake fluid in wheel-brake cylinder 15 flows through P-section cutoff valve 1 into the master-cylinder side. In this manner, the pressure reduction operating mode for wheel-brake cylinder 15 is achieved.

During a master-cylinder-based pressure build-up operating mode utilizing master-cylinder pressure, hydraulic system valves 1, 2, 3, and 5 included in the P section are conditioned in their de-activated states. That is, P-section cutoff valve 1 is fully opened, P-section inlet valve 2 is fully closed, and inflow valves 3 and 5 are fully opened. At this time, outflow valves 4 and 6 are both conditioned in their valve-closed states (de-activated states). As a result, brake fluid in master cylinder 22 is delivered via valves 1 and 3 into wheel-brake cylinder 15, and also delivered via valves 1 and 5 into wheel-brake cylinder 16. In this manner, the master-cylinder-based pressure build-up operating mode for wheel-brake cylinder 15 is achieved. Under these conditions, when switching from the master-cylinder-based pressure build-up operating mode to the pressure reduction operating mode, inflow valves 3 and 5 are energized and thus switched to their fully-closed positions. At the same time, outflow valves 4 and 6 are energized and thus switched to their valve-open positions. As a result of this, the brake fluid in wheel-brake cylinder 15 flows through outflow valve 4 into pressure reservoir 19. Brake fluid accumulated in pressure reservoir 19 is returned to the master-cylinder side by means of pumps 13 and 14, both driven by motor 21. Thus, each of pumps 13 and 14 is often called "return pump".

Referring now to FIG. 2, there is shown the block diagram of electronic control unit (ECU) 30 applicable to the vehicle attitude control system of the embodiment interacting with the brake control system. ECU 30 generally comprises a microcomputer. ECU 30 includes an input/output interface (I/O), memories (RAM, ROM), and a microprocessor or a central processing unit (CPU). The input/output interface (I/O) of ECU 30 receives input information from various engine/vehicle switches and sensors, namely wheel-speed sensors, a steering angle sensor, a lateral-G sensor, a yaw rate sensor, a brake switch, wheel-brake cylinder pressure detectors and the like. The wheel-speed sensors are provided to detect wheel speeds of road wheels and to estimate a pseudo vehicle speed and a wheel slip rate of each individual road wheel. Sensor signals from the wheel-speed sensors are important for execution of each of anti-skid control and traction control. The wheel-brake cylinder pressure detectors are provided to detect actual wheel-brake cylinder pressures of the road wheels. The steering angle sensor and the yaw rate sensor are mainly used for vehicle dynamics control. The lateral-G sensor is provided to detect lateral acceleration exerted on the vehicle body, and often used for skid control and vehicle dynamics control so as to estimate a friction factor $\mu$ of the road surface, often abbreviated to "road-surface $\mu$". A switch signal from the brake switch is mainly used for anti-skid control. Within ECU 30, the central processing unit (CPU) allows the access by the I/O interface of input informational data signals from the previously-discussed engine/vehicle switches and sensors. The CPU of ECU 30 is responsible for carrying the engine/vehicle control program stored in memories and is capable of performing necessary arithmetic and logic operations containing at least ABS control, TCS control, and VDC control, achieved through the previously-noted hydraulic actuator A. Computational results (arithmetic calculation results), that is, calculated output signals are relayed through the output interface circuitry of ECU 30 to output stages, namely motor 21, and solenoids of hydraulic system valves 1–12.

As clearly shown in FIG. 2, the processor of ECU 30 is comprised of an ABS control section 31, a VDC control section 32, and a TCS control section 33. ABS control section 31 is provided to perform ABS control that prevents a wheel lock-up condition in an emergency or panic-stop situation and avoids the braking distance from increasing and thus provide maximum effective braking. VDC control section 32 is provided to execute vehicle dynamics control (or vehicle stability control), which is performed by automatically controlling yawing motion of the vehicle by a controlled yawing moment produced through hydraulic actuator A. TCS control section 33 is provided to perform TCS control that prevents undesired acceleration slip of the vehicle. Also provided is a hydraulic-system valve drive signal calculation section 34, which calculates a drive signal value for each of the hydraulic-system valves responsively to a signal from each of ABS control section 31, VDC control section 32, and TCS control section 33. Also provided is a motor-DUTY calculation section or a motor duty ratio determination section 35, which calculates a duty ratio of a pulse-width modulated signal to be outputted to motor 21 of the pump-and-motor assembly (13, 14, 21), responsively to the signal from each of ABS control section 31, VDC control section 32, and TCS control section 33. Drive signals, corresponding to the drive signal values calculated by valve drive signal calculation section 34, are output through the output interface of ECU 30 to the respective hydraulic-system valves of hydraulic actuator A for valve opening/closing control. At the same time, a drive signal or a pulse-width modulated (PWM) signal, corresponding to the duty ratio calculated by motor-DUTY calculation section 35, is output through the output interface of ECU 30 to motor 21, so as to drive the pumps.

Figure 3:
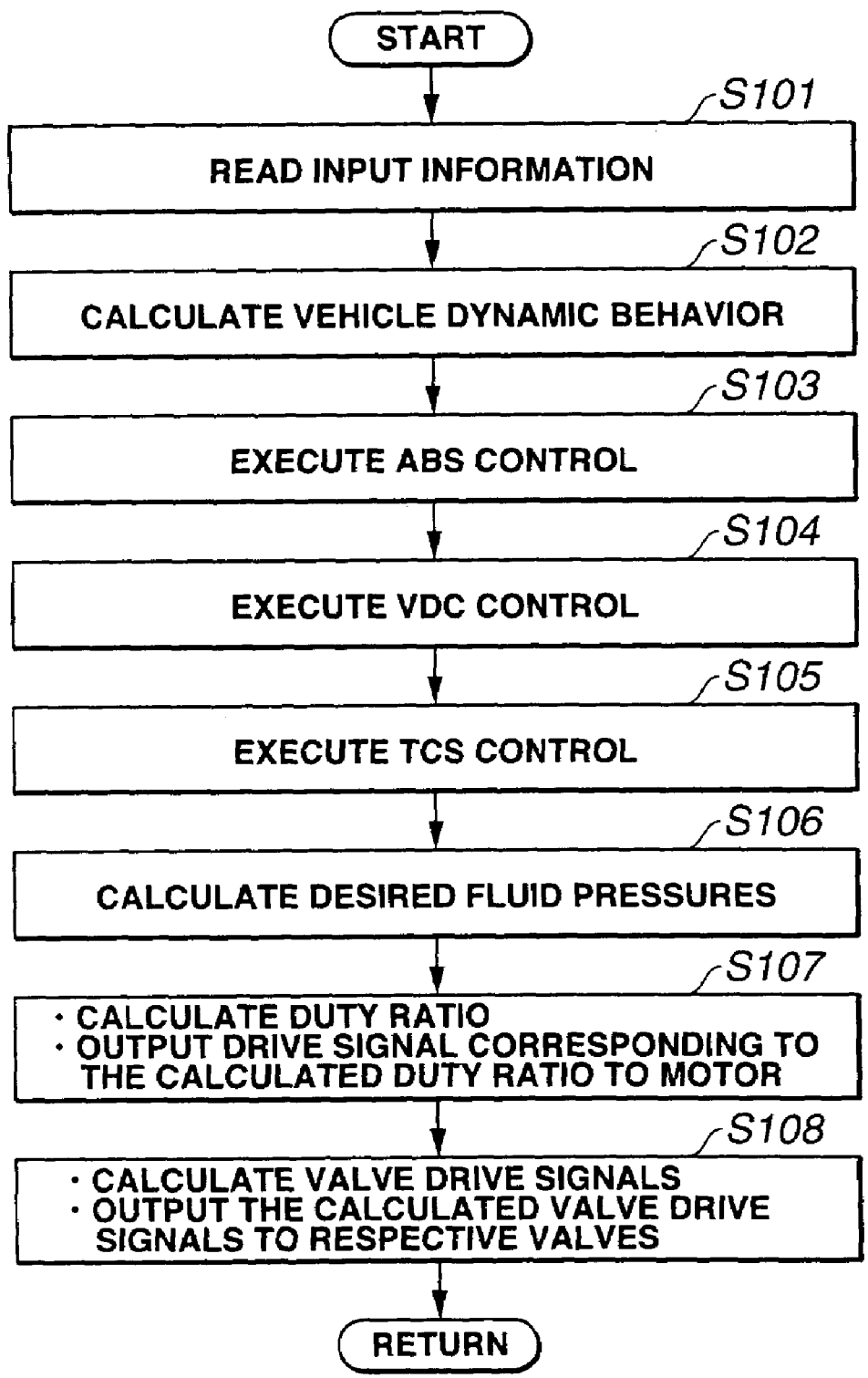
FIG. 3 is a flow chart showing a brake control routine for the brake control system interacting with the vehicle attitude control system of the embodiment.

Referring now to FIG. 3, there is shown the brake control routine executed within ECU 30 of the brake control system interacting with the vehicle attitude control system of the embodiment. The brake control routine of FIG. 3 is executed as time-triggered interrupt routines to be triggered at predetermined time intervals (i.e., periodically).

At step S101, input information regarding signal values from the engine/vehicle sensors and the brake switch is read.

At step S102, the current vehicle dynamic behavior at the current execution cycle, is calculated or estimated based on the input information (the sensor signals), from a predetermined or preprogrammed car model, which represents and assumes the essential vehicle dynamics of the host vehicle.

At step S103, anti-skid control (ABS control) is executed in response to a signal from ABS control section 31, to prevent wheel lock-up. The method of anti-skid control is conventional and forms no part of the present invention, detailed description of anti-skid control is omitted. For instance, in an emergency or panic-stop situation, ABS control section 31 operates to prevent a wheel lock-up condition by way of on/off reaction of the solenoid valves within hydraulic actuator A.

At step S104, vehicle dynamics control (VDC control) is executed in response to a signal from VDC control section 32, so that a controlled yawing moment is produced in a direction that stabilizes the vehicle dynamic behavior or enhances the vehicle cornering stability, so as to reduce undesirable understeer or oversteer tendencies. The method of vehicle dynamics control is conventional and forms no part of the present invention, detailed description of vehicle dynamics control is omitted.

At step S105, traction control is executed in response to a signal from TCS control section 33, to prevent undesirable acceleration slip (wheel-spin) during an accelerating condition. The method of traction control is conventional and forms no part of the present invention, detailed description of traction control is omitted.

At step S106, desired fluid pressures of wheel-brake cylinders 15–18 are calculated based on the command signal from each individual control section (that is, ABS control section 31, VDC control section 32, and TCS control section 33).

At step S107, a duty ratio of a pulse-width modulated signal needed to drive the motor 21 is calculated by the processor of ECU 30, and additionally a drive signal (or a control signal), corresponding to the calculated duty ratio, is output to motor 21.

At step S108, hydraulic-system valve drive signals for the respective hydraulic-system valves are calculated based on the desired fluid pressures calculated through step S106. Additionally, the calculated valve drive signals (control signals) are output to the respective hydraulic-system valves.

Figure 4:
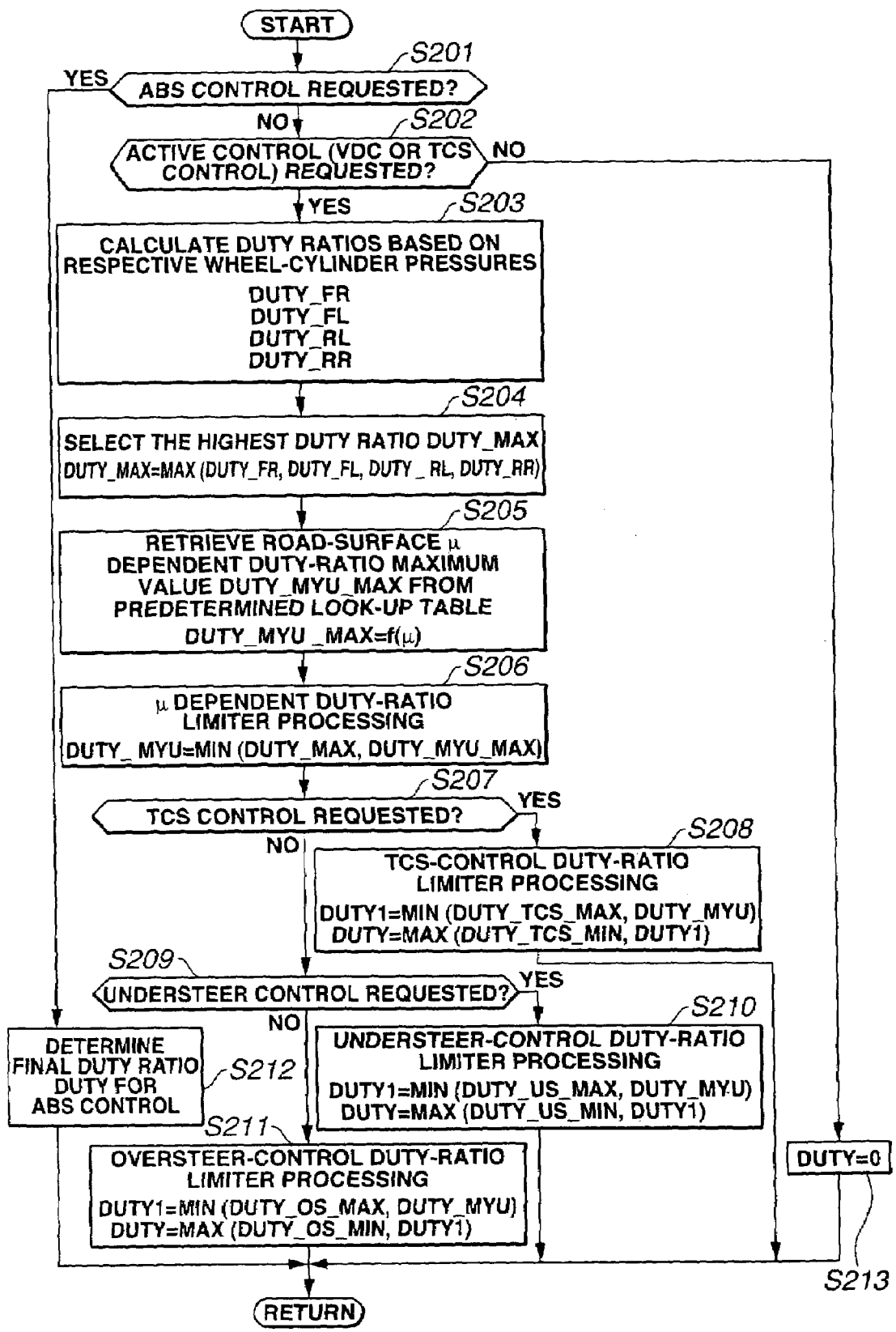
FIG. 4 is a flow chart showing the arithmetic and logic processing needed to determine a duty ratio of a pulse-width modulated signal applied to a motor of a pump-and-motor assembly incorporated in the vehicle attitude control system of the embodiment.

Referring now to FIG. 4, there is shown the detailed flow diagram of the motor-DUTY arithmetic and logic processing (see step S107 of FIG. 3) executed within the processor of ECU 30 for determining the duty ratio of the PWM signal applied to motor 21 of the pump-and-motor assembly. Motor 21 is driven in response to the duty ratio determined by the motor-DUTY arithmetic and logic routine of FIG. 4. The routine of FIG. 4 is also executed as time-triggered interrupt routines to be triggered at predetermined time intervals.

At step S201, a check is made to determine whether a request for anti-skid control (ABS control) is present. When the answer to step S201 is in the affirmative (YES), that is, ECU 30 determines that the request for ABS control is present, the routine proceeds from step S201 to step S212. Conversely when the answer to step S201 is in the negative (NO), that is, ECU 30 determines that the request for ABS control is absent, the routine proceeds from step S201 to step S202.

At step S202, a check is made to determine whether a request for active vehicle dynamic behavior control or active vehicle attitude control (simply, "active control"), such as VDC control or TCS control, is present. When the answer to step S202 is affirmative (YES), that is, in presence of the request of active control, the routine proceeds from step S202 to step S203. Conversely when the answer to step S202 is negative (NO), that is, in absence of the request for active control, the routine proceeds from step S202 to step S213.

At step S203, motor duty ratios DUTY_FR, DUTY_FL, DUTY_RL, and DUTY_RR, needed for motor drive control of motor 21, are calculated based on the respective desired fluid pressures of wheel-brake cylinders 15–18 calculated through step S106, for each and every road wheel. The more detailed explanation concerning motor-DUTY arithmetic calculation processing for duty ratios DUTY_FR, DUTY_FL, DUTY_RL, and DUTY_RR, calculated based on the respective desired wheel-brake cylinder pressures through step S203, will be described later by reference to FIGS. 5 and 6.

At step S204, the highest one DUTY_MAX of four wheel-cylinder pressure dependent motor duty ratios DUTY_FR, DUTY_FL, DUTY_RL, and DUTY_RR, calculated based on the respective wheel-brake cylinder pressures through step S203, is selected by way of a so-called select-HIGH process DUTY_MAX=MAX(DUTY_FR, DUTY_FL, DUTY_RL, DUTY_RR). The highest duty ratio DUTY_MAX is hereinafter referred to as "select-HIGH duty ratio DUTY_MAX".

At step S205, a road-surface μ dependent duty-ratio maximum value DUTY_MYU_MAX is calculated or retrieved based on the current road-surface μ, which can be estimated based on the lateral acceleration detected by the lateral-G sensor and used for the other vehicle control, such as VDC control or ABS control, from a predetermined road-surface μ dependent duty-ratio maximum value DUTY_MYU_MAX look-up table f(μ), that is, DUTY_MYU_MAX=f(μ), which are preprogrammed to balance the required wheel-brake cylinder pressure and the motor noise level, both varying depending on the road-surface μ. Road-surface μ dependent duty-ratio maximum value DUTY_MYU_MAX means an upper limit value of the time rate of change in the wheel-brake cylinder pressure (an upper limit value of the wheel-brake cylinder pressure gradient).

At step S206, a road-surface μ dependent duty-ratio limiter processing is made based on select-HIGH duty ratio DUTY_MAX calculated through step S204 and μ dependent duty-ratio maximum value DUTY_MYU_MAX calculated through step S205. Concretely, by way of a so-called select-LOW process DUTY_MYU=MIN(DUTY_MAX, DUTY_MYU_MAX), the lower one of select-HIGH duty ratio DUTY_MAX and μ dependent duty-ratio maximum value DUTY_MYU_MAX is selected as a μ dependent duty-ratio limiter-processed duty ratio DUTY_MYU.

At step S207, a check is made to determine whether a request for traction control (TCS control) is present. When the answer to step S207 is affirmative (YES), that is, ECU 30 determines that the request for TCS control is present, the routine proceeds from step S207 to step S208. Conversely when the answer to step S207 is negative (NO), that is, ECU 30 determines that the request for TCS control is absent, the routine proceeds from step S207 to step S209.

At step S208, a TCS-control period duty-ratio limiter processing is executed. First, a TCS-control period duty-ratio upper limiter processing is made based on a predetermined TCS-control period duty-ratio maximum value DUTY_TCS_MAX and μ dependent duty-ratio limiter-processed duty ratio DUTY_MYU. Concretely, by way of a select-LOW process DUTY1=MIN(DUTY_TCS_MAX, DUTY_MYU), the lower one of predetermined TCS-control period duty-ratio maximum value DUTY_TCS_MAX and μ dependent duty-ratio limiter-processed duty ratio DUTY_MYU is selected as a temporary motor duty ratio DUTY1.

Under these conditions, suppose that there is no request for the pump-based pressure build-up operating mode during the TCS control and thus motor 21 is suddenly switched to its stopped state. Suddenly stopping the motor drive may cause extreme electric current owing to counter electromotive force. At this time, suppose that motor 21 is re-started or re-driven immediately after motor 21 has been stopped. In such a case, there is a possibility that the motor restart responsiveness or the motor-drive responsiveness is greatly deteriorated, and additionally there is an increased tendency for sinuous noise to arise during operation of motor 21 in the TCS control mode. For the reasons discussed above, in determining a final motor duty ratio DUTY for TCS control, a predetermined TCS-control period duty-ratio minimum value DUTY_TCS_MIN is further provided. That is, as a second limiter process, a TCS-control period duty-ratio lower limiter processing is made based on predetermined_TCS-control period duty-ratio minimum value DUTY_TCS_MIN and temporary motor duty ratio DUTY1. More concretely, by way of a select-HIGH process DUTY=MAX(DUTY_TCS_MIN, DUTY1), the higher one of predetermined TCS-control period duty-ratio minimum value DUTY_TCS_MIN and temporary motor duty ratio DUTY1 is selected as the final duty ratio DUTY. Therefore, even when there is no request for the pump-based pressure build-up operating mode during TCS control, motor 21 can be driven in response to the drive signal (the PWM signal) of the duty ratio greater than or equal to predetermined TCS-control period duty-ratio minimum value DUTY_TCS_MIN that ensures a low motor speed corresponding to a less pump discharge pressure, during the TCS control period. This enhances the motor restart responsiveness or the motor-drive responsiveness and realizes the stable motor-drive control during the TCS control period.

At step S209, a check is made to determine whether a request for understeer control (a certain VDC control) is present. When the answer to step S209 is affirmative (YES), that is, in presence of the request of understeer control, the routine proceeds from step S209 to step S210. Conversely when the answer to step S209 is negative (NO), that is, in absence of the request for understeer control, ECU 30 determines that the request for oversteer control is present rather than the request for understeer control, and thus the routine proceeds from step S209 to step S211.

At step S210, an understeer-control period duty-ratio limiter processing is executed. First, an understeer-control period duty-ratio upper limiter processing is made based on a predetermined understeer-control period duty-ratio maximum value DUTY_US_MAX and μ dependent duty-ratio limiter-processed duty ratio DUTY_MYU. Concretely, by way of a select-LOW process DUTY1=MIN(DUTY_US_MAX, DUTY_MYU), the lower one of predetermined understeer-control period duty-ratio maximum value DUTY_US_MAX and μ dependent duty-ratio limiter-processed duty ratio DUTY_MYU is selected as a temporary motor duty ratio DUTY1.

Under these conditions, assuming that there is no request for the pump-based pressure build-up operating mode during the understeer control and thus motor 21 is suddenly switched to its stopped state, suddenly stopping the motor drive may cause extreme electric current owing to counter electromotive force. Additionally, assuming that motor 21 is re-started or re-driven at once from the stopped state, there is a possibility that the motor restart responsiveness or the motor-drive responsiveness is greatly deteriorated, and also there is an increased tendency for sinuous noise to arise during operation of motor 21 in the understeer control mode. For the reasons discussed above, in determining a final motor duty ratio DUTY for understeer control, a predetermined understeer-control period duty-ratio minimum value DUTY_US_MIN is further provided. That is, as a second limiter process, an understeer-control period duty-ratio lower limiter processing is made based on predetermined understeer-control period duty-ratio minimum value DUTY_US_MIN and temporary motor duty ratio DUTY1. More concretely, by way of a select-HIGH process DUTY=MAX(DUTY_US_MIN, DUTY1), the higher one of predetermined understeer-control period duty-ratio minimum value DUTY_US_MIN and temporary motor duty ratio DUTY1 is selected as the final duty ratio DUTY. Therefore, even when there is no request for the pump-based pressure build-up operating mode during understeer control, motor 21 can be driven in response to the drive signal (the PWM signal) of the duty ratio greater than or equal to predetermined understeer-control period duty-ratio minimum value DUTY_US_MIN that ensures a low motor speed corresponding to a less pump discharge pressure, during the understeer control period. This enhances the motor restart responsiveness or the motor-drive responsiveness and realizes the stable motor-drive control during the understeer control period.

At step S211, a duty-ratio limiter processing for active control except both of TCS control and understeer control, that is, an oversteer-control period duty-ratio limiter processing is executed. First, an oversteer-control period duty-ratio upper limiter processing is made based on a predetermined oversteer-control period duty-ratio maximum value DUTY_OS_MAX and μ dependent duty-ratio limiter-processed duty ratio DUTY_MYU. Concretely, by way of a select-LOW process DUTY1=MIN(DUTY_OS_MAX, DUTY_MYU), the lower one of predetermined oversteer-control period duty-ratio maximum value DUTY_OS_MAX and μ dependent duty-ratio limiter-processed duty ratio DUTY_MYU is selected as a temporary motor duty ratio DUTY1.

Under these conditions, assuming that there is no request for the pump-based pressure build-up operating mode during the oversteer control and thus motor 21 is suddenly switched to its stopped state, suddenly stopping the motor drive may cause extreme electric current owing to counter electromotive force. Additionally, assuming that motor 21 is re-started or re-driven at once from the stopped state, there is a possibility that the motor restart responsiveness or the motor-drive responsiveness is greatly deteriorated, and also there is an increased tendency for sinuous noise to arise during operation of motor 21 in the oversteer control mode. For the reasons discussed above, in determining a final motor duty ratio DUTY for oversteer control, a predetermined oversteer-control period duty-ratio minimum value DUTY_OS_MIN is further provided. That is, as a second limiter process, an oversteer-control period duty-ratio lower limiter processing is made based on predetermined oversteer-control period duty-ratio minimum value DUTY_OS_MIN and temporary motor duty ratio DUTY1. More concretely, by way of a select-HIGH process DUTY=MAX (DUTY_OS_MIN, DUTY1), the higher one of predetermined oversteer-control period duty-ratio minimum value DUTY_OS_MIN and temporary motor duty ratio DUTY1 is selected as the final duty ratio DUTY. Therefore, even when there is no request for the pump-based pressure build-up operating mode during oversteer control, motor 21 can be driven in response to the drive signal (the PWM signal) of the duty ratio greater than or equal to predetermined oversteer-control period duty-ratio minimum value DUTY_OS_MIN that ensures a low motor speed corresponding to a less pump discharge pressure, during the oversteer control period. This enhances the motor restart responsiveness or the motor-drive responsiveness and realizes the stable motor-drive control during the oversteer control period.

At step S212, a final duty ratio DUTY suitable for ABS control is set or determined based on the slip rate of each road wheel and the pseudo vehicle speed.

At step S213, a final duty ratio DUTY for motor 21 is set to "0", since there is no request of each of ABS control, TCS control, understeer control and oversteer control.

Figure 5:
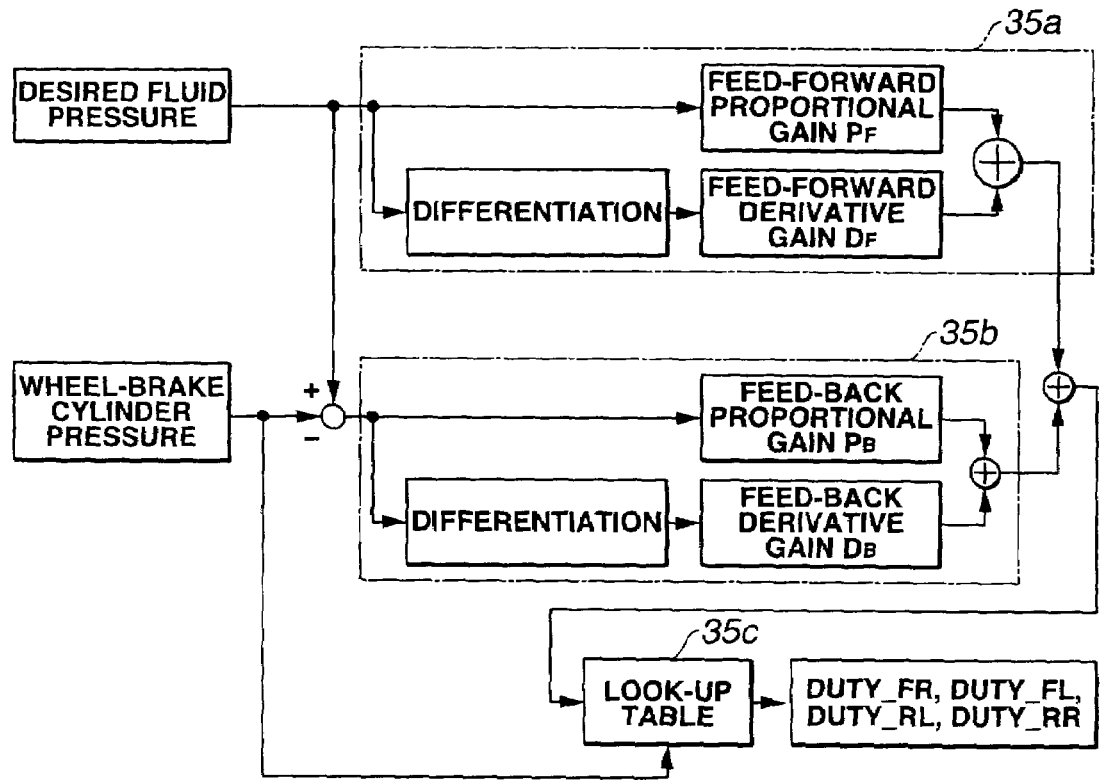
FIG. 5 is a block diagram showing details of a motor duty arithmetic calculation section of the control unit of FIG. 2.
Figure 6:
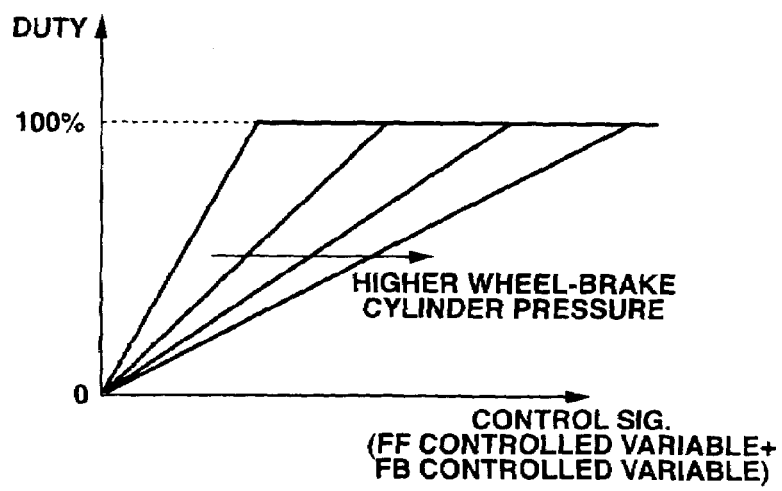
FIG. 6 is a preprogrammed characteristic map showing the relationship among a wheel-brake cylinder pressure, a control signal value, and a motor-drive duty ratio DUTY.

Referring now to FIG. 5, there is shown the detailed block diagram of motor-DUTY calculation section 35 performing the motor-DUTY arithmetic calculation by which duty ratios DUTY_FR, DUTY_FL, DUTY_RL, and DUTY_RR, are computed and determined based on the respective desired wheel-brake cylinder pressures (see step S203).

As clearly seen from the block diagram of FIG. 5, motor-DUTY calculation section 35 is comprised of a feedforward-control controlled-variable calculation section 35a, a feedback-control controlled-variable calculation section 35b, and a predetermined look-up table 35c. Note that the input of feedforward-control controlled-variable calculation section 35a is an input signal $E_{FFin}(t)$ indicative of the desired fluid pressure of each of wheel-brake cylinders 15–18. The output (i.e., a feedforward-control controlled variable $E_{FFout}(t)$) of feedforward-control controlled-variable calculation section 35a is a linear combination of a proportional term and a derivative term with an adjustable gain for each term. The proportional term ($P_F \times E_{FFin}(t)$) is obtained by multiplying input signal $E_{FFin}(t)$ indicative of the desired fluid pressure with a feedforward proportional gain $P_F$, whereas the derivative term ($D_F \times \{dE_{FFin}(t)/dt\}$) is obtained by multiplying the derivative $\{dE_{FFin}(t)/dt\}$ of input signal $E_{FFin}(t)$ with a feedforward derivative gain $D_F$. That is, feedforward-control controlled variable $E_{FFout}(t)$ generated from feedforward-control controlled-variable calculation section 35a is represented as the summed value [$(P_F \times E_{FFin}(t))+(D_F \times \{dE_{FFin}(t)/dt\})$] of the proportional term ($P_F \times E_{FFin}(t)$) and the derivative term ($D_F \times \{dE_{FFin}(t)/dt\}$).

On the other hand, note that the input of feedback-control controlled-variable calculation section 35b is a deviation signal $E_{FBin}(t)$ between the previously-noted signal $E_{FFin}(t)$ indicative of the desired fluid pressure of the wheel-brake cylinder and a signal indicative of the actual wheel-brake cylinder pressure of the same wheel-brake cylinder. The output (i.e., a feedback-control controlled variable $E_{FBout}(t)$) of feedback-control controlled-variable calculation section 35b is a linear combination of a proportional term and a derivative term with an adjustable gain for each term. The proportional term ($P_B \times E_{FBin}(t)$) is obtained by multiplying deviation signal $E_{FBin}(t)$ indicative of the difference between the desired fluid pressure and the actual wheel-brake cylinder pressure with a feedback proportional gain $P_B$, whereas the derivative term ($D_B \times \{dE_{FBin}(t)/dt\}$) is obtained by multiplying the derivative $\{dE_{FBin}(t)/dt\}$ of deviation signal $E_{FBin}(t)$ with a feedback derivative gain $D_B$. That is, feedback-control controlled variable $E_{FBout}(t)$ generated from feedback-control controlled-variable calculation section 35b is represented as the sum [$(P_B \times E_{FBin}(t))+(D_B \times \{dE_{FBin}(t)/dt\})$] of the proportional term ($P_B \times E_{FBin}(t)$) and the derivative term ($D_B \times \{dE_{FBin}(t)/dt\}$).

In the shown embodiment, feedforward proportional gain $P_F$, feedforward derivative gain $D_F$, feedback proportional gain $P_B$, and feedback derivative gain $D_B$ suitable for the front wheel side are predetermined or preset independently of those for the rear wheel side.

After feedforward-control controlled variable $E_{FFout}(t)$ has been generated from feedforward-control controlled-variable calculation section 35a and at the same time feedback-control controlled variable $E_{FBout}(t)$ has been generated from feedback-control controlled-variable calculation section 35b, feedforward-control controlled variable $E_{FFout}(t)$ and feedback-control controlled variable $E_{FBout}(t)$ are added by means of an adder. The sum $\{E_{FFout}(t)+E_{FBout}(t)\}$ of feedforward-control controlled variable $E_{FFout}(t)$ and feedback-control controlled variable $E_{FBout}(t)$ is temporarily determined as a control signal for motor 21. The final motor duty ratio or the motor duty controlled variable (simply, the motor duty ratio) DUTY is calculated or retrieved based on the actual wheel-brake cylinder pressure (actual W/C pressure $P_{W/C}$) and the control signal $\{E_{FFout}(t)+E_{FBout}(t)\}$ from the predetermined look-up table or the predetermined characteristic map of FIG. 6, that is, DUTY=f($P_{W/C}$, $E_{FFout}(t)+E_{FBout}(t)$).

As will be appreciated from the above, according to the vehicle attitude control system interacting with the brake control system, when executing motor drive control of motor 21 for vehicle attitude control (TCS control or VDC control), the duty ratio of the PWM signal (control signal) applied to motor 21, which drives each of pumps 13 and 14, is determined based on a desired fluid pressure of at least one of wheel-brake cylinders 15–18. Therefore, as necessary, that is, responsively to the desired fluid pressure of the one wheel-brake cylinder, the system of the embodiment can achieve motor drive control (motor speed control) of motor 21 of the pump-and-motor assembly (13, 14, 21). This enables reasonably silent motor drive during the vehicle attitude control.

Additionally, as compared to a vehicle attitude control system in which an electric motor of a pump-and-motor assembly is fully rotated for fluid pressure supply during vehicle attitude control, the system of the embodiment can set the time rate of change in motor speed to a minimum, thus ensuring a moderate wheel-brake cylinder pressure change. This contributes to a properly suppressed wheel-brake cylinder pressure change when opening or closing each of the hydraulic system valves, thus lowering or eliminating any unnatural feeling that the driver experiences uncomfortable fluctuations in dynamic vehicle behavior occurring due to fluctuations in the wheel-brake cylinder pressures.

Furthermore, according to the system of the embodiment, duty ratios (DUTY_FR, DUTY_FL, DUTY_RL, DUTY_RR), needed for motor drive control of motor 21, are calculated based on the respective desired fluid pressures of wheel-brake cylinders 15–18. Of these wheel-cylinder pressure dependent motor duty ratios DUTY_FR, DUTY_FL, DUTY_RL, and DUTY_RR, the highest duty ratio DUTY_MAX of is selected, and then the motor drive control is executed based on the selected highest duty ratio DUTY_MAX. Thus, it is possible to certainly produce a required braking force, thus enabling execution of stable vehicle attitude control.

Moreover, according to the system of the embodiment, a road-surface $\mu$ dependent duty-ratio maximum value DUTY_MYU_MAX is calculated based on a road-surface $\mu$, and the road-surface $\mu$ dependent duty-ratio limiter processing is made based on the $\mu$ dependent duty-ratio maximum value DUTY_MYU_MAX calculated, such that the motor duty ratio does not exceed the $\mu$ dependent duty-ratio maximum value DUTY_MYU_MAX.

Hereupon, the motor duty controlled variable DUTY means a motor duty ratio of the PWM signal needed for motor drive control (motor speed control) of motor 21. The motor duty controlled variable DUTY also means a motor duty cycle value needed to control a fluid pressure gradient of wheel-brake cylinder pressure. Therefore, the motor duty-ratio limiter processing (containing the road-surface $\mu$ dependent duty-ratio limiter processing of step S206, the TCS-control period duty-ratio limiter processing of step S208, the understeer-control period duty-ratio limiter processing of step S210, and the oversteer-control period duty-ratio limiter processing of step S211) also means the fluid pressure gradient limiter processing. For instance, a controlled fluid pressure gradient of VDC control executed during vehicle driving on low-$\mu$ roads tends to be lower than that of VDC control executed during vehicle driving on high-$\mu$ roads, and additionally a wheel-lock brake fluid pressure of the low-$\mu$ road driving tends to be lower than that of the high-$\mu$ road driving. Thus, in case of VDC control executed during vehicle driving on low-$\mu$ roads, it is possible to adequately satisfactorily accomplish the required fluid pressure of each individual wheel-brake cylinder by way of comparatively low pump speeds (comparatively low motor speeds), in other words, a comparatively low motor duty ratio (a comparatively low motor duty controlled variable). On the contrary, in case of VDC control executed during vehicle driving on high-$\mu$ roads, quick control responsiveness, that is, a comparatively high motor duty ratio (a comparatively high motor duty controlled variable) is required. However, when the VDC system is in operation during vehicle driving on high-$\mu$ roads, perhaps the driver cannot hear noise created by the hydraulic pump and motor assembly owing to the other noise, such as increased road-surface noise and tire squeal noise. Therefore, in order to realize optimum motor noise control in due consideration of the road-surface $\mu$, in the system of the embodiment, by way of the road-surface $\mu$ dependent duty-ratio limiter processing of step S206, the maximum value of the motor duty ratio DUTY is limited in a manner so as to not exceed the $\mu$ dependent duty-ratio maximum value DUTY_MYU_MAX, whose characteristic map is preprogrammed to balance the required wheel-brake cylinder pressure and the motor noise level, both varying depending on the road-surface $\mu$. Therefore, the system of the embodiment can effectively optimally suppress or control the noise created by motor 21 and pumps 13 and 14, taking the road-surface $\mu$ into consideration.

Regarding a plurality of vehicle attitude control modes, such as TCS and VDC control modes, the upper limit value of the required wheel-brake cylinder pressure gradient suited for TCS control is different from that suited for VDC control. For instance, in case of TCS control, for braking-force application to the less-traction wheels (drive wheels) spinning owing to acceleration slip, comparatively high wheel-brake cylinder pressures are generally required for the respective wheel-brake cylinders associated with the spinning less-traction wheels. In contrast to the above, during VDC control such as understeer suppression control or oversteer suppression control, the pressure level of each of wheel-brake cylinder pressures applied to only the specific wheel-brake cylinders, which are subjected to VDC control, tends to be generally lower than that of the applied wheel-brake cylinder pressure of the TCS control. From the viewpoint discussed above, the system of the embodiment uses (i) the predetermined TCS-control period duty-ratio maximum value DUTY_TCS_MAX suited for the TCS-control period duty-ratio limiter processing and (ii) a VDC-control period duty-ratio maximum value DUTY_VDC_MAX (predetermined understeer-control period duty-ratio maximum value DUTY_US_MAX or predetermined oversteer-control period duty-ratio maximum value DUTY_OS_MAX) suited for the VDC-control period duty-ratio limiter processing, the predetermined TCS-control period duty-ratio maximum value DUTY_TCS_MAX and the VDC-control period duty-ratio maximum value DUTY_VDC_MAX, such as DUTY_US_MAX or DUTY_OS_MAX, differing from each other.

In particular, regarding VDC control classified into at least understeer and oversteer controls, the system of the embodiment uses (i) the predetermined understeer-control period duty-ratio maximum value DUTY_US_MAX suited for the understeer-control period duty-ratio limiter processing (see step S210) and (ii) the predetermined oversteer-control period duty-ratio maximum value DUTY_OS_MAX suited for the oversteer-control period duty-ratio limiter processing (see step S211), the predetermined understeer-control period duty-ratio maximum value DUTY_US_MAX and the predetermined oversteer-control period duty-ratio maximum value DUTY_OS_MAX differing from each other. For instance, in order to reduce understeer tendencies during cornering, only the rear-inner road wheel is generally subjected to understeer suppression control. On the other hand, in order to reduce oversteer tendencies during cornering, both of the outer road wheels are generally subjected to oversteer suppression control. As set forth above, according to the system of the embodiment, the VDC-control period motor duty-ratio maximum value suited for the VDC-control period duty-ratio limiter processing can be switched between predetermined understeer-control period duty-ratio maximum value DUTY_US_MAX and predetermined oversteer-control period duty-ratio maximum value DUTY_OS_MAX, depending on whether the current VDC control is understeer suppression control (simply, understeer control) or oversteer suppression control (simply, oversteer control). Thus, it is possible to more accurately calculate the motor duty ratio DUTY, depending on whether the vehicle dynamics control is understeer control or oversteer control.

As set out above, the upper limit value of motor duty ratio DUTY can be effectively properly suppressed or limited by way of the previously-noted limiter processing (the road-surface μ dependent duty-ratio limiter processing of step S206, the TCS-control period duty-ratio limiter processing of step S208, the understeer-control period duty-ratio limiter processing of step S210, and the oversteer-control period duty-ratio limiter processing of step S211), thus attaining reasonably silent motor drive of motor 21 of the pump-and-motor assembly. Therefore, even when VDC control or TCS control is initiated and executed at a comparatively earlier timing, there is a less possibility of occurrence of sinuous noise during operation of motor 21, thus eliminating any unnatural feeling that the driver experiences uncomfortable motor noise and vibrations. That is, it is possible to positively initiate and execute the vehicle dynamics control or vehicle stability control.

Additionally, according to the system of the embodiment, during each execution cycle of the TCS control mode or the VDC control mode, a preset motor-drive lowest duty ratio DUTY_MIN (predetermined TCS-control period duty-ratio minimum value DUTY_TCS_MIN or predetermined understeer-control period duty-ratio minimum value DUTY_US_MIN or predetermined oversteer-control period duty-ratio minimum value DUTY_OS_MIN) is further taken into consideration. If the motor duty ratio calculated based on the desired wheel-brake cylinder pressure is less than the preset motor-drive lowest duty ratio DUTY_MIN (DUTY_TCS_MIN used during TCS control, DUTY_US_MIN used during understeer control, or DUTY_OS_MIN used during oversteer control), the final motor duty DUTY is set at preset motor-drive lowest duty ratio DUTY_MIN. Predetermined understeer-control period duty-ratio minimum value DUTY_US_MIN and predetermined oversteer-control period duty-ratio minimum value DUTY_OS_MIN are collectively referred to as "predetermined VDC-control period duty-ratio minimum value DUTY_VDC_MIN". By virtue of the duty-ratio lower limiter processing, it is possible to efficiently drive motor 21 responsively to a motor drive signal of a duty ratio greater than or equal to preset motor-drive lowest duty ratio DUTY_MIN that ensures a low motor speed corresponding to less pump discharge pressure and capable of maintaining rotation of motor 21 with a light motor load, during vehicle attitude control (TCS control or VDC control). This contributes to stable motor drive control (stable motor speed control) having high control responsiveness, and also eliminates undesirable sinuous motor noise.

In the shown embodiment, as can be seen from the block diagram of FIG. 5, feedforward-control controlled-variable calculation section 35a is constructed as a two-term (PD) FF-controlled-variable calculation section whose output is a linear combination of a proportional term ($P_F \times E_{FFin}(t)$) and a derivative term ($D_F \times \{dE_{FFin}(t)/dt\}$), whereas feedback-control controlled-variable calculation section 35b is constructed as a two-term (PD) FB-controlled-variable calculation section whose output is a linear combination of a proportional term ($P_B \times E_{FBin}(t)$) and a derivative term ($D_B \times \{dE_{FBin}(t)/dt\}$). In lieu thereof, feedforward-control controlled-variable calculation section 35a may be constructed as a three-term (PID) FF-controlled-variable calculation section whose output is a linear combination of a proportional term ($P_F \times E_{FFin}(t)$), an integral term ($I_F \times \{\int E_{FFin}(t) dt\}$), and a derivative term ($D_F \times \{dE_{FFin}(t)/dt\}$), where $I_F$ denotes a feed-forward integral gain, whereas feedback-control controlled-variable calculation section 35b may be constructed as a three-term (PID) FB-controlled-variable calculation section whose output is a linear combination of a proportional term ($P_B \times E_{FBin}(t)$), an integral term ($I_B \times \{\int E_{FBin}(t) dt\}$), and a derivative term ($D_B \times \{dE_{FBin}(t)/dt\}$), where $I_B$ denotes a feed-back integral gain.

The entire contents of Japanese Patent Application No. 2003-207685 (filed Aug. 18, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle attitude control system of an automotive vehicle comprising:
   a hydraulic pump and motor assembly comprising at least one hydraulic pump and a motor driving the pump;
   a hydraulic actuator that regulates fluid pressures in wheel-brake cylinders of road wheels of the vehicle, independently of each other; and
   a control unit being configured to be electronically connected to at least the motor and the hydraulic actuator, for executing vehicle attitude control by controlling a discharge pressure of the motor-driven pump and by controlling the fluid pressures in the wheel-brake cylinders to respective desired fluid pressures independently of each other; the control unit comprising a processor programmed to:
      determine a duty ratio of a drive signal of the motor, based on the desired fluid pressure of at least one of the wheel-brake cylinders;
      calculate duty ratios, needed for motor drive control, based on the respective desired fluid pressures of the wheel-brake cylinders of the road wheels;
      select a highest duty ratio of the duty ratios as the duty ratio of the drive signal of the motor;
      calculate a road-surface friction factor dependent duty-ratio maximum value based on a road-surface friction factor (μ); and
      execute a road-surface μ dependent duty-ratio limiter processing for limiting an upper limit value of the duty ratio of the drive signal of the motor to the road-surface μ dependent duty-ratio maximum value,
   wherein the road-surface μ dependent duty-ratio limiter processing comprises a select-low process by which a lower duty ratio of the selected highest duty ratio and the road-surface μ dependent duty-ratio maximum value is selected as the duty ratio of the drive signal of the motor.

2. The vehicle attitude control system as claimed in claim 1, wherein the processor is further programmed to:
   execute a traction-control period duty-ratio upper limiter processing for limiting an upper limit value of the duty ratio of the drive signal of the motor to a predetermined traction-control period duty-ratio maximum value.

3. The vehicle attitude control system as claimed in claim 2, wherein the traction-control period duty-ratio upper limiter processing comprises a select-low process by which a lower duty ratio of the predetermined traction-control period duty-ratio maximum value and the lower duty ratio of the selected highest duty ratio and the road-surface μ dependent duty-ratio maximum value is selected as the duty ratio of the drive signal of the motor.

4. The vehicle attitude control system as claimed in claim 3, wherein the processor is further programmed to:
   execute a vehicle dynamics control (VDC) period duty-ratio upper limiter processing for limiting an upper limit value of the duty ratio of the drive signal of the motor to a predetermined VDC period duty-ratio maximum value.

5. The vehicle attitude control system as claimed in claim 4, wherein the VDC period duty-ratio upper limiter processing comprises a select-low process by which a lower duty ratio of the predetermined VDC period duty-ratio maximum value and the lower duty ratio of the selected highest duty ratio and the road-surface μ dependent duty-ratio maximum value is selected as the duty ratio of the drive signal of the motor.

6. The vehicle attitude control system as claimed in claim 4, wherein the predetermined VDC period duty-ratio maximum value is set to be different from the predetermined traction-control period duty-ratio maximum value.

7. The vehicle attitude control system as claimed in claim 4, wherein the predetermined VDC period duty-ratio maximum value is switched between a predetermined understeer-control period duty-ratio maximum value suited for understeer control and a predetermined oversteer-control period duty-ratio maximum value suited for oversteer control, depending on whether the VDC is the understeer control or the oversteer control.

8. The vehicle attitude control system as claimed in claim 7, wherein the predetermined understeer-control period duty-ratio maximum value is set to be different from the predetermined oversteer-control period duty-ratio maximum value.

9. The vehicle attitude control system as claimed in claim 2, wherein the processor is further programmed to:
   execute a traction-control period duty-ratio lower limiter processing for limiting a lower limit value of the duty ratio of the drive signal of the motor to a predetermined traction-control period duty-ratio minimum value.

10. The vehicle attitude control system as claimed in claim 4, wherein the processor is further programmed to:
    execute a VDC period duty-ratio lower limiter processing for limiting a lower limit value of the duty ratio of the drive signal of the motor to a predetermined VDC period duty-ratio minimum value.

11. A vehicle attitude control system of an automotive vehicle for executing at least vehicle dynamics control (VDC), the system comprising:
    a hydraulic pump and motor assembly comprising at least one hydraulic pump and a motor driving the pump;
    a hydraulic actuator that regulates fluid pressures in wheel-brake cylinders of road wheels of the vehicle, independently of each other; and
    a control unit being configured to be electronically connected to at least the motor and the hydraulic actuator, for executing VDC by controlling a discharge pressure of the motor-driven pump and by controlling the fluid pressures in the wheel-brake cylinders to respective desired fluid pressures independently of each other; the control unit comprising a processor programmed to:
    determine a duty ratio of a drive signal of the motor, based on the desired fluid pressure of at least one of the wheel-brake cylinders during VDC,
    wherein the VDC is configured to control a yawing motion of the vehicle to reduce undesirable understeer or oversteer tendencies, and
    wherein the processor is programmed to determine the duty ratio of the drive signal of the motor, based on the desired fluid pressure of at least one of the wheel-brake cylinders by:
    (a) calculating a feedforward-control controlled variable $E_{FFout}(t)$ as a linear combination of a proportional term and a derivative term; the proportional term $PF \times E_{FFin}(t)$ being obtained by multiplying an input signal $E_{FFin}(t)$ indicative of the desired fluid pressure with a feedforward proportional gain PF, and the derivative term $DF \times \{dE_{FFin}(t)/dt\}$ being obtained by multiplying a derivative $dE_{FFin}(t)/dt$ of the input signal $E_{FFin}(t)$ with a feedforward derivative gain DF;
    (b) calculating a feedback-control controlled variable $E_{FBout}(t)$ as a linear combination of a proportional term and a derivative term; the proportional term $PB \times E_{FBin}(t)$ being obtained by multiplying a deviation signal $E_{FBin}(t)$ between the input signal $E_{FFin}(t)$ indicative of the desired fluid pressure and a signal indicative of an actual wheel-brake cylinder pressure with a feedback proportional gain PB, and the derivative term $DB \times \{dE_{FBin}(t)/dt\}$ being obtained by multiplying a derivative $dE_{FBin}(t)/dt$ of the deviation signal $E_{FBin}(t)$ with a feedback derivative gain DB;
    (c) calculating a sum $E_{FFout}(t) + E_{FBout}(t)$ of the feedforward-control controlled variable $E_{FFout}(t)$ and the feedback-control controlled variable $E_{FBout}(t)$; and
    (d) determining the duty ratio of the drive signal of the motor based on the sum $E_{FFout}(t) + E_{FBout}(t)$.

12. A vehicle attitude control method of simultaneously executing motor noise control and vehicle dynamics control (VDC) by controlling a discharge pressure of a pump driven by a motor of a vehicle and by controlling fluid pressures in wheel-brake cylinders of road wheels to respective desired fluid pressures independently of each other by a hydraulic actuator, the method comprising the steps of:
    determining a duty ratio of a drive signal of the motor, based on the desired fluid pressure of at least one of the wheel-brake cylinders during VDC, wherein the VDC is configured to control a yawing motion of the vehicle to reduce undesirable understeer or oversteer tendencies;
    calculating duty ratios, needed for motor drive control, based on the respective desired fluid pressures of the wheel-brake cylinders of the road wheels;
    selecting a highest duty ratio of the duty ratios;
    calculating a road-surface friction factor dependent duty-ratio maximum value based on a road-surface friction factor (μ);
    executing a road-surface μ dependent duty-ratio limiter processing for limiting an upper limit value of the duty ratio of the drive signal of the motor to the road-surface μ dependent duty-ratio maximum value by selecting a lower duty ratio of the selected highest duty ratio and the road-surface μ dependent duty-ratio maximum value;
    executing a traction-control period duty-ratio upper limiter processing for limiting the upper limit value of the duty ratio to a predetermined traction-control period duty-ratio maximum value by selecting a lower duty ratio of the predetermined traction-control period duty-ratio maximum value and the lower duty ratio of the selected highest duty ratio and the road-surface μ dependent duty-ratio maximum value; and executing a VDC period duty-ratio upper limiter processing for limiting the upper limit value of the duty ratio to a predetermined VDC period duty-ratio maximum value by selecting a lower duty ratio of the predetermined VDC period duty-ratio maximum value and the lower duty ratio of the selected highest duty ratio and the road-surface μ dependent duty-ratio maximum value.

13. A vehicle attitude control method of simultaneously executing motor noise control and vehicle dynamics control (VDC) by controlling a discharge pressure of a pump driven by a motor of a vehicle and by controlling fluid pressures in wheel-brake cylinders of road wheels to respective desired fluid pressures independently of each other by a hydraulic actuator, the method comprising the steps of:

determining a duty ratio of a drive signal of the motor, based on the desired fluid pressure of at least one of the wheel-brake cylinders during VDC, wherein the VDC is configured to control a yawing motion of the vehicle to reduce undesirable understeer or oversteer tendencies, and wherein the step of determining the duty ratio of the drive signal of the motor, based on the desired fluid pressure of at least one of the wheel-brake cylinders, comprises:

(a) calculating a feedforward-control controlled variable $E_{FFout}(t)$ as a linear combination of a proportional term and a derivative term; the proportional term $PF \times E_{FFin}(t)$ being obtained by multiplying an input signal $E_{FFin}(t)$ indicative of the desired fluid pressure with a feedforward proportional gain PF, and the derivative term $DF \times \{dE_{FFin}(t)/dt\}$ being obtained by multiplying a derivative $dE_{FFin}(t)/dt$ of the input signal $E_{FFin}(t)$ with a feedforward derivative gain DF;

(b) calculating a feedback-control controlled variable $E_{FBout}(t)$ as a linear combination of a proportional term and a derivative term; the proportional term $PB \times E_{FBin}(t)$ being obtained by multiplying a deviation signal $E_{FBin}(t)$ between the input signal $E_{FFin}(t)$ indicative of the desired fluid pressure and a signal indicative of an actual wheel-brake cylinder pressure with a feedback proportional gain PB, and the derivative term $DB \times \{dE_{FBin}(t)/dt\}$ being obtained by multiplying a derivative $dE_{FBin}(t)/dt$ of the deviation signal $E_{FBin}(t)$ with a feedback derivative gain DB;

(c) calculating a sum $E_{FFout}(t)+E_{FBout}(t)$ of the feedforward-control controlled variable $E_{FFout}(t)$ and the feedback-control controlled variable $E_{FBout}(t)$; and (d) determining the duty ratio of the drive signal of the motor based on the sum $E_{FFout}(t)+E_{FBout}(t)$.

* * * * *